(12) United States Patent
Yamauchi et al.

(10) Patent No.: US 6,682,424 B2
(45) Date of Patent: Jan. 27, 2004

(54) VIDEO GAME DEVICE, THROW GUIDE DISPLAYING METHOD IN VIDEO GAME, AND COMPUTER READABLE RECORDING MEDIUM RECORDING THROWING GUIDE DISPLAY PROGRAM

(75) Inventors: Madoka Yamauchi, Toyonaka (JP); Masaru Moriwaki, Osaka (JP)

(73) Assignee: Konami Corporation, Tokyo (JP)

( * ) Notice: Subject to any disclaimer, the term of this patent is extended or adjusted under 35 U.S.C. 154(b) by 410 days.

(21) Appl. No.: 09/765,264

(22) Filed: Jan. 18, 2001

(65) Prior Publication Data

US 2001/0008846 A1 Jul. 19, 2001

(30) Foreign Application Priority Data

Jan. 19, 2000 (JP) ........................................ 2000-011021

(51) Int. Cl.[7] .................................................. A63F 9/24
(52) U.S. Cl. ............................................. 463/31; 463/2
(58) Field of Search ..................... 463/1–5, 30–34, 463/37–38; 273/317.1, 317.6, 317.7, 317.8, 317.9, 368, 369; 473/125, 130, 266

(56) References Cited

U.S. PATENT DOCUMENTS 5,435,554 A * 7/1995 Lipson ........................... 463/3

FOREIGN PATENT DOCUMENTS

| EP | 0808644 | * 11/1997 | ............. A63F/9/22 |
| EP | 0920892 | 6/1999 | |
| EP | 0962891 | 12/1999 | |
| JP | 10-052572 | 2/1998 | |

OTHER PUBLICATIONS

Monthly ASCII vol. 8, No. 6, 1984, p. 167 (Jun. of 1984).
Page 18 of a copy of a manual of "Decathlete" sold by SEGA enterprises in 1996.

* cited by examiner

Primary Examiner—Kim Nguyen
(74) Attorney, Agent, or Firm—Jordan and Hamburg LLP

(57) ABSTRACT

A video game device in which a game screen displayed on a monitor is controlled by operating an operation unit, the video game device comprises a character display control unit for displaying a player character in such a manner as to be rotatable together with a throwing object character and making such a display that the throwing object character is thrown in a specified direction by the player character when the operation unit is operated at a specified timing, and a guide display control unit for setting a guide display area in a partial area of the game screens, displaying a throwing mark in the guide display area which mark moves in response to a rotation of the throwing object character, and displaying an area mark specifying a throwing area of the throwing object character in association with the guide display area.

37 Claims, 11 Drawing Sheets

VIDEO GAME DEVICE, THROW GUIDE DISPLAYING METHOD IN VIDEO GAME, AND COMPUTER READABLE RECORDING MEDIUM RECORDING THROWING GUIDE DISPLAY PROGRAM

The present invention relates to a video game device using an optical disk, a magnetic disk, a semiconductor memory or a cassette-type recording medium storing program data, a throw guide displaying method in a video game and a computer-readable recording medium storing a throwing guide display program.

BACKGROUND OF THE INVENTION AND RELATED ART STATEMENT

A huge number of video game systems have been proposed. These systems include, for example, systems comprised of a special device for home use and a television monitor and systems comprised of a special device for business use, a personal computer or a workstation, a display and a sound output device. Any one of these systems includes a controller used by a game player for operation, a storage medium storing game program data, a CPU for executing controls to generate images and sounds based on the game program data, a processor for generating images, a processor for generating sounds, a CRT or like monitor for displaying images, and a loudspeaker for outputting sounds. CD-ROMs, semiconductor memories, cassette-type storage mediums having a built-in semiconductor memory are frequently used as the above storage medium.

As one type of games executed by such a game system, throwing games such as hammer throwing game or discus throwing game can be counted. In the throwing game, a player character who makes a rotating movement throws a throwing object character such as a hammer or a discus in a specified direction when a game player operates a controller (operation unit) in a game space displayed on a monitor, and a flying distance of the throwing object character is computed.

In such a throwing game, it is preferable to guide the game player when to throw (i.e. operation timing of the controller) so that the throwing object character can be thrown as far as possible. Japanese Unexamined Patent Publication No. 10-52572 proposes a method for guiding the throwing of a throwing object character in a throwing game.

Specifically, the above publication discloses that an arrow image which rotates along substantially the same trace of rotation as a throwing object character is displayed in a position proximate to the throwing object character which is so displayed as to rotate together with a player character on a monitor, the number of rotation of the throwing object character, a throwing power (throwing energy) given to the throwing object character as the throwing object character rotates, a throwing angle of the throwing object character, etc. are simultaneously displayed, and a throwing timing is suitably guided so that a throwing operation is performed when the throwing power, the throwing angle, etc. reach specified values and the arrow image is located within the throwing area.

However, according to the throwing guiding method disclosed in the above publication, the arrow image is so displayed in vicinity of the throwing object character as to rotate along substantially the same trace of rotation of the throwing object character and, thus, the number of rotation, the throwing power and other factors used to grasp the throwing timing are obliged to be displayed in positions away from the arrow image. Therefore, it is disadvantageously difficult for the game player to exactly grasp the throwing timing unless constantly carefully looking at a wide area of the game screen.

Further, in order to make the game more interesting and ingenious, it is preferable to make it possible to display game screens on which the player character and the throwing object character are viewed from a plurality of different viewing points and those on which the player character and the throwing object character are viewed at different distances, but from the same viewing point. However, in such a case, the display position of the arrow image is moved every time the viewing point or the viewing distance changes. This makes it even more difficult to exactly grasp the throwing timing.

SUMMARY OF THE INVENTION

In view of the above situation, an object of the present invention is to provide a video game device which enables a throwing timing of a throwing object character to be exactly grasped, a throw guide displaying method in a video game and a computer-readable recording medium storing a throwing guide display program.

In order to fulfill the above object, according to the invention, a video game device in which a game screen displayed on a monitor is controlled by operating an operation unit, comprising:

a character display control unit for displaying a player character in such a manner as to be rotatable together with a throwing object character and making such a display that the throwing object character is thrown in a specified direction by the player character when the operation unit is operated at a specified timing, and a guide display control unit for setting a guide display area in a partial area of the game screen, displaying a throwing mark in the guide display area which mark moves in response to a rotation of the throwing object character, and displaying an area mark specifying a throwing area of the throwing object character in association with the guide display area.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
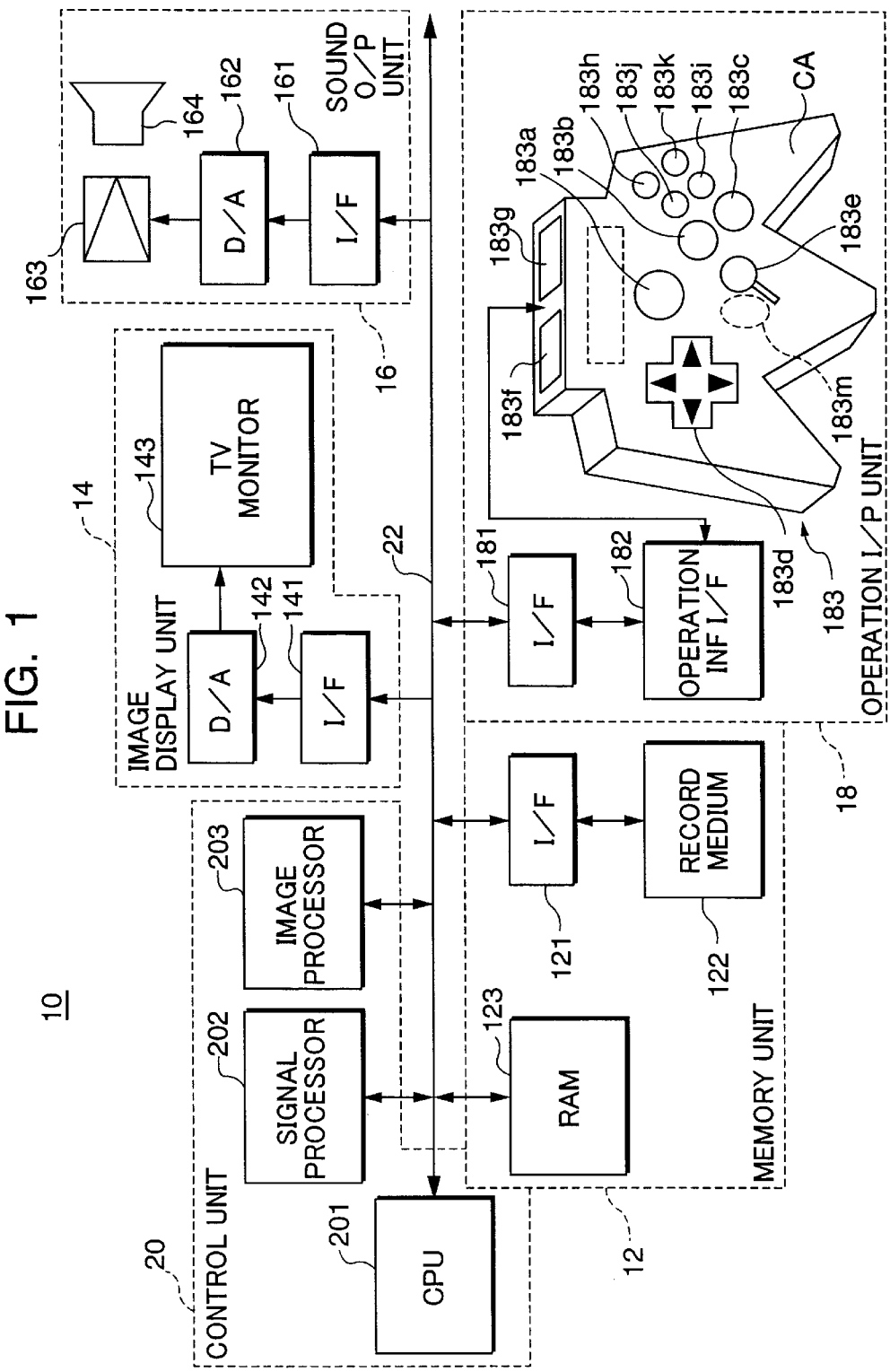
FIG. 1 is a construction diagram showing a video game system to which a throw guide displaying method according to one embodiment of the present invention is applied.

FIG. 1 is a diagram showing the schematic construction of a video game system (video game device) 10 to which a throw guide displaying method according to one embodiment of the present invention is applied. In FIG. 1, the video game system 10 is provided with a memory unit 12, an image display unit 14, a sound output unit 16, an operation input unit 18 and a control unit 20. The units 12, 14, 16 and 18 are connected with each other via a bus 22 including address buses, data buses and control buses connected with a CPU 201 of the control unit 20 to be described later.

In the memory unit 12 are stored game data comprised of image data, sound data and program data. The memory unit 12 includes a storage medium 122 connected with the bus 22 via an interface circuit 121 and a RAM 123 for temporarily storing the game data read from the storage medium 122. The storage medium 122 is, for example, a so-called ROM cassette in which a ROM or like storage medium storing game data and program data of an operating system is accommodated in a plastic casing, an optical disk, or a flexible disk.

The image display unit 14 is adapted to display various game images in accordance with the progress of the game and includes a digital-to-analog (D/A) converter 142 connected with the bus 22 via an interface circuit 141 and a television monitor (video monitor) 143 including a CRT, a liquid crystal display or the like connected with the D/A converter 142.

The sound output device 16 is adapted to output a game music, sound effects, etc. in accordance with the progress of the game and is provided with a D/A converter 162 connected with the bus 22 via an interface circuit 161, an amplifying circuit 163 connected with the D/A converter 162, and a loudspeaker 164 for outputting sounds in accordance with an output signal from the amplifying circuit 163.

The operation input unit 18 is adapted to output operation signals to the control unit 20 and is provided with an operational information interface circuit 182 connected with a bus 22 via an interface circuit 181, and a controller 183 connected with the operational information interface circuit 182. The controller 183 includes a start button 183a, an A-button 183b, a B-button 183c, a cross-shaped key 183d, a stick-shaped controller 183e, a C1-button 183h, a C2-button 183i, a C3-button 183j and a C4-button 183k provided on the front surface of a casing CA, a left trigger button 183f and a right trigger button 183g provided on the upper surface of the casing CA, and a Z-button 183m provided on the rear surface of the casing CA.

The stick-shaped controller 183e has substantially the same construction as a joystick. Specifically, the controller 183e has a standing stick (operation bar), which can be inclined to front, back, left, right or in any direction in a 360° range about a specified point of the stick as a supporting point. According to the direction and angle of inclination of the stick, an X-coordinate along transverse direction and a Y-direction along forward/backward direction in coordinate systems having the standing position of the stick as an origin are sent to the control unit 20 via the interface circuits 182 and 182.

The control unit 20 is adapted to control the progress of the game, and is comprised of the CPU 201 connected with the bus 22, a signal processor 202 and an image processor 203. The signal processor 202 mainly performs calculation of image data in a three-dimensional (3D) space, calculation for transforming a position in the 3D space to a position in a simulated 3D space, a light source calculation, and generation and processing of sound data. The image processor 203 writes an image data to be displayed in the RAM 123 based on the calculation results in the signal processor 202. For example, the image processor 202 writes a texture data in an area of the RAM 123 specified by a polygon.

The video game system 10 thus constructed takes different modes according to its application. Specifically, in the case that the video game system 10 is constructed for business use, all the elements shown in FIG. 1 are, for example, contained in one casing. In the case that the video game system 10 is constructed for home use, the television monitor 143, the amplifying circuit 163 and the loudspeaker 164 are separate from a main game unit.

Here, the main game unit is, for example, comprised of the interface circuit 121 connected with the CPU 201, the RAM 123, the interface circuit 141, the D/A converter 142, the interface circuit 161, the D/A converter 162, the interface circuit 181, the operational information interface circuit 182, the controller 183, the signal processor 202 and the image processor 203. This main game unit is constructed by accommodating the respective elements in a casing made of a synthetic resin, and the storage medium 122 is detachably mounted in a mounting portion formed in this casing. The controller 183 is connected with a connector provided in the casing via a communication cable or the like.

In the case that the video game system 10 is constructed with a personal computer or a workstation as a core, for example, the television monitor 143 corresponds a computer display, the image processor 203 corresponds to part of the game program data stored in the storage medium 122 or hardware on an extension board mounted on an extension slot of the computer, and the interface circuits 121, 141, 161, 181, the D/A converters 142, 162, and the operational information interface circuit 182 correspond to hardware on the extension board mounted on the extension slot of the computer.

A case where the video game system 10 is constructed for home use is described below.

Next, the operation of the video game system 10 is summarily described. First, when an unillustrated power switch is turned on to activate the video game system 10, the CPU 201 reads image data, sound data and game program data from the storage medium 122 in accordance with the operating system stored in the storage medium 122, and all or part of the read image data, sound data and game program data are stored in the RAM 123. Thereafter, a specified game is proceeded by the CPU 201 in accordance with the game program data stored in the RAM 123 and contents of instructions given by a game player via the controller 183.

Specifically, commands as tasks for forming images and outputting sounds are generated in accordance with contents of instructions given by a game player via the controller 183. The signal processor 202 performs calculation of display positions of characters in the 3D space (of course the same applies for a two-dimensional space), a light source calculation, generation and processing of sound data, etc. in accordance with these commands.

Data of images to be formed are written in the RAM 123 by the image processor 203 based on the calculation results. The image data written in the RAM 123 are fed to the D/A converter 142 via the interface circuit 141, and fed to the television monitor 143 after being converted into analog video signals in the D/A converter 142, thereby being displayed as game images on a display surface of the television monitor 143.

On the other hand, the sound data outputted from the signal processor 202 are fed to the D/A converter 162 via the interface circuit 161 and outputted as sounds from the loudspeaker 164 via the amplifying circuit 163 after being converted into analog sound signals in the D/A converter 162.

Next, contents of the game executed in the video game system 10 are summarily described. In this video game system 10, one game can be selected from a plurality of competition games by operating the start button 183a. Here, a hammer throwing game in which a throwing object character which is a hammer is thrown in a specified direction by a player character who is a hammer thrower, and a flying distance (thrown distance) of the throwing object character is computed. The player character throws the throwing object character after giving a throwing power to the throwing object character by, e.g. making a maximum of 5 turns in clockwise direction together with the throwing object character.

This hammer throwing game is played by one to four game players in this embodiment and is such that as many player characters as the game players are caused to successively appear on a game screen, the respective player characters throws a hammer once in turn each time, and ranking (victory) is contended based on a maximum flying distance of the three throws made by the respective player characters. In the memory unit 12 are stored flying distance data of player characters who do not appear on the game screen. Ranking is determined for both the player characters who appear on the game screen and those who do not. Therefore, this game can be played even by a single game player.

Figure 2:
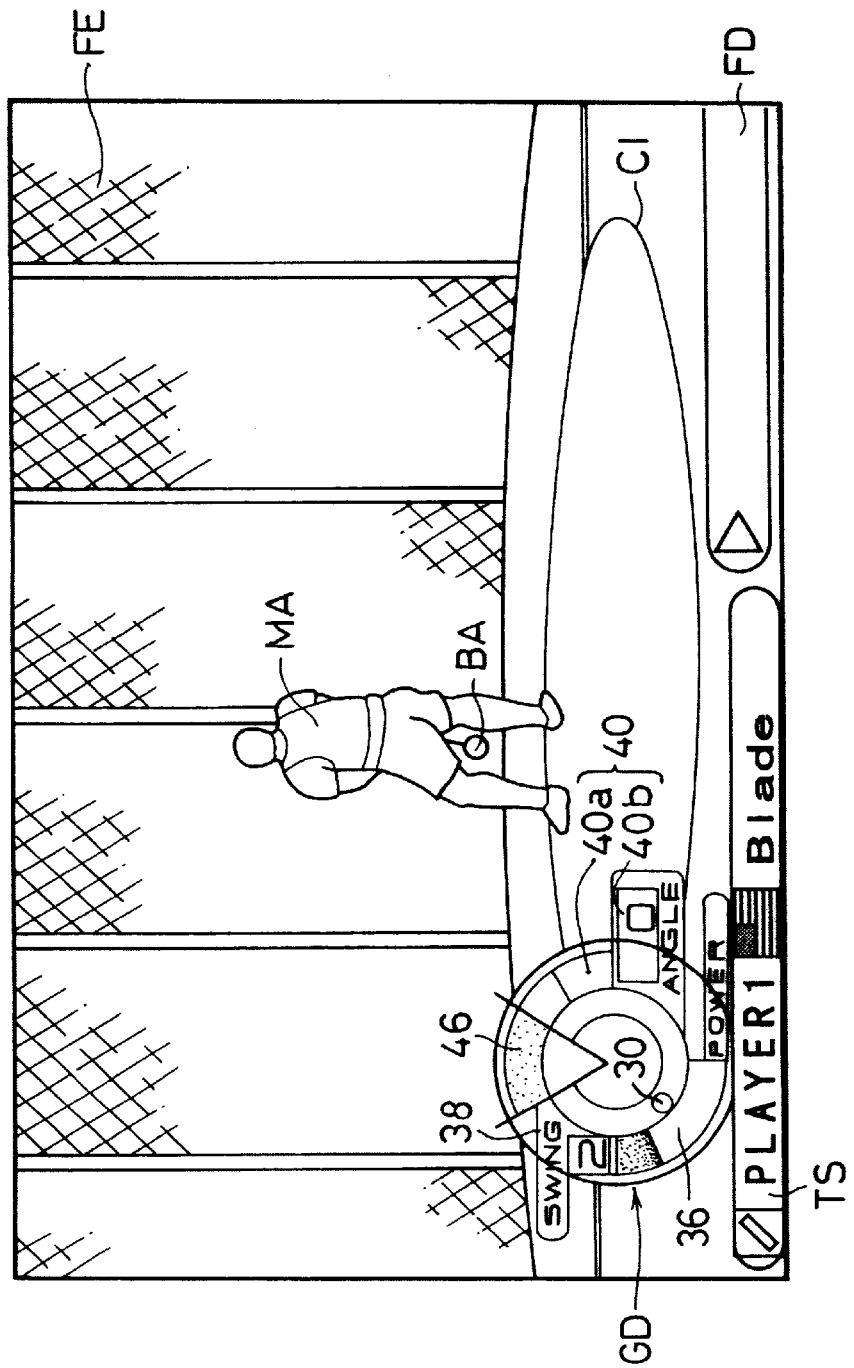
FIG. 2 is a diagram showing one game screen in the video game system shown in FIG. 1.

Next, a display example of the game screen is described with reference to FIG. 2. The game screen shown in FIG. 2 shows one scene which comes up while the game is actually proceeded. Specifically, on this screen, a player character MA holding onto an end of a steel wire attached to a throwing object character BA which is a hammer comprised of a metallic ball is displayed in the middle of a circle CI drawn on a field, and a guide display section GD for guiding a throwing timing of the throwing object character BA (i.e. timing at which the game player operates the controller 183 in a specified manner) is displayed in a position spaced away from a display area of the player character MA and the throwing object character BA.

The guide display section GD is displayed in a substantially fixed specified position even if the game screen changes as a viewing point of the player character MA and the throwing object character BA changes. The specific construction of the guide display section GD is described later. A fence FE is displayed on the game screen, and an appearing player column TS for displaying an appearing order of the play character MA, a national flag of his nation and his name is set at the bottommost of the game screen. Here, "PLAYER1" which means a player who appears in the first place, the national flag of the USA and the name "Blade" of the play character MA are displayed.

A foul display column FD for displaying "FAUL" when the controller 183 is not operated for a predetermined time despite the fact that the game was already started is laterally displayed at the right side of the bottommost of the game screen. For example, "TIME10" is displayed in the foul display column FD when the controller 183 is not operated for a predetermined time (e.g. 30 sec.), and the displayed numerical value is counted down every second and "FOUL" is displayed upon the lapse of 30 sec.

Figure 3:
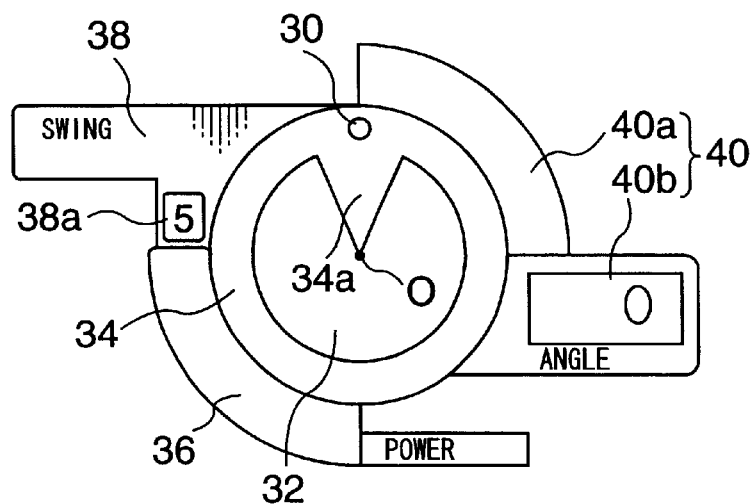
FIG. 3 is a diagram showing the construction of a guide display section in the video game system shown in FIG. 1.

FIG. 3 is a diagram showing the construction of the guide display section GD in detail. Specifically, the guide display section GD is comprised of a throwing mark 30, a ring-shaped guide display area 34, a level display area 36, a rotation index display area 38 and an angle display area 40. The throwing mark 30 is in the form of a small circle which rotates as the throwing object character BA rotates. The guide display area 34 is an area for rotating the throwing mark 30 along a circular track and is formed along the outer periphery of a reference circle 32 located in the center. The level display area 36 is formed outside the guide display area 34 between a bottom position and a left position, and displays the level of stored throwing power corresponding to a flying distance which power is given to the throwing object character BA. The rotation index display area 38 is formed outside the guide display area 34 between the left position and a top position, and displays an index relating to the number of rotation of the player character MA and the throwing object character BA. The angle display area 40 is formed outside the guide display area 34 between the top position and a right position, and displays a throwing angle of the throwing object character BA.

The guide display area 34 includes, at its upper portion, a V-shaped portion 34a which extends to a center O of the reference circle 32 (i.e. circle 32 located inside the ring-shaped guide display area 34). The rotation index display area 38 includes a numerical value display zone 38a at its lower portion. At the start of the game, "5" which is a maximum permissible rotation number of the player character MA and the throwing object character BA is displayed in the display zone 38a. The angle display area 40 is formed by integrally providing a color display zone 40a to be colored in chromatic colors and a numerical value display zone 40b formed therebelow continues with each other. At the start of the game, "0" is displayed in the display zone 40b.

Figure 4:
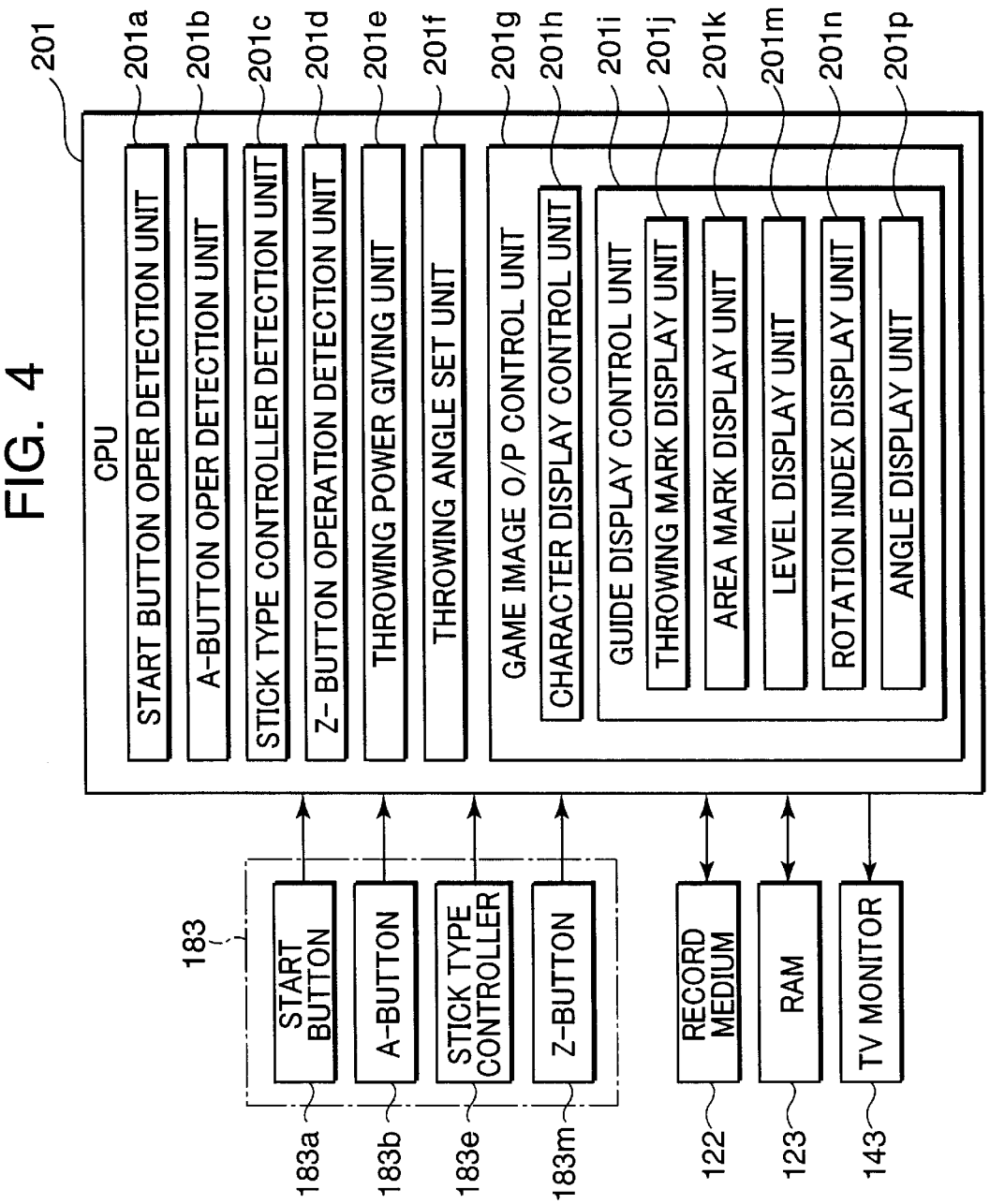
FIG. 4 is a block diagram showing functions of a CPU, a stick-shaped controller, various buttons and the like in the video game system shown in FIG. 1, FIGS. 5 and 6 are diagrams showing the construction of the guide display section in the video game system shown in FIG. 1.

FIG. 4 is a block diagram showing function realizing means of the CPU 201, the storage medium 122, the RAM 123, the television monitor 143 and the controller 183 (start-button 183a, A-button 183b, stick-shaped controller 183e and Z-button 183m). The interface circuits, buses, etc. are not shown in FIG. 4 in order to simplify the description.

Specifically, the CPU 201 is provided with the respective function realizing means as a start button operation detection unit 201a, an A-button operation detection unit 201b, a stick-shaped controller operation detection unit 201c, a Z-button operation detection unit 201d, a throwing power giving unit 201e, a throwing angle setting unit 201h and a game screen output control unit 201g. The game screen output control unit 201g is provided with a character display control unit 201h and a guide display control unit 201i. The guide display control unit 201i is provided with a throwing mark display unit 201j, an area mark display unit 201k, a level display unit 201m, a rotation index display unit 201n and an angle display unit 201p.

The start button operation detection unit 201a detects whether the start button 183a has been turned on or off in accordance with an operation signal from the start button 183a. One game is selected from a plurality of games when the start button 183a is turned on. The A-button operation detection unit 201b detects whether the A-button 182b has been turned on or off in accordance with an operation signal from the A-button 183b. The game is started upon detecting that the A-button 183b has been turned on.

The stick-shaped controller operation detection unit 201c detects a signal sent when the stick-shaped controller 183e has successively passed specified four positions: up, down, left and right positions which are set beforehand by rotating it while being maximally inclined. When the stick-shaped controller 183e is operated, the rotation (clockwise in this embodiment) of the player character MA and the throwing object character BA is started. Upon start of the rotation of the player character MA and the throwing object character BA, the rotation (clockwise in this embodiment) of the throwing mark 30 displayed in the guide display section GD is accordingly started.

The Z-button operation detection unit 201d detects whether the Z-button 183m has been turned on or off in accordance with an operation signal from the Z-button 183m. Upon detecting that the Z-button 183m has been turned on while the throwing mark 30 is located within a throwing area specified by an area mark 48 to be described later, the rotation of the throwing mark 30 is stopped, and the rotating speed of the player character MA and the throwing object character BA is largely reduced. If the Z-button 183m is turned on while the throwing mark 30 is not located in the throwing area, this throw is judged to be "FOUL".

The throwing power giving unit 201e cumulatively gives the throwing power corresponding to the flying distance of the throwing object character BA, e.g. to increase the throwing power by "1" every time the stick of the controller 183e successively passes the above four predetermined positions. As the level of the stored throwing power increases as the controller 183e is rotated, the rotating speed of the player character MA and the throwing object character BA is increased and the flying distance when the throwing object character BA is thrown increases. As the level of the stored throwing power increases, the rotating speed of the throwing mark 30 is also increased.

The throwing angle setting unit 201f cumulatively sets the throwing angle of the throwing object character BA while the Z-button 183m is kept on. When the Z-button 183m is turned off when the throwing angle reaches a specified value, the throwing object character BA is thrown to fly a preset distance determined based on the stored throwing power and the set throwing angle.

The game screen output control unit 201g reads a game screen corresponding to a game content and outputs it to the television monitor 143. The character display control unit 201h controls the display of the player character MA, the throwing object character BA (see FIG. 2), etc. in association with the progress of the game. The guide display control unit 201i controls the display of the guide display section (see FIG. 2).

Figure 5:
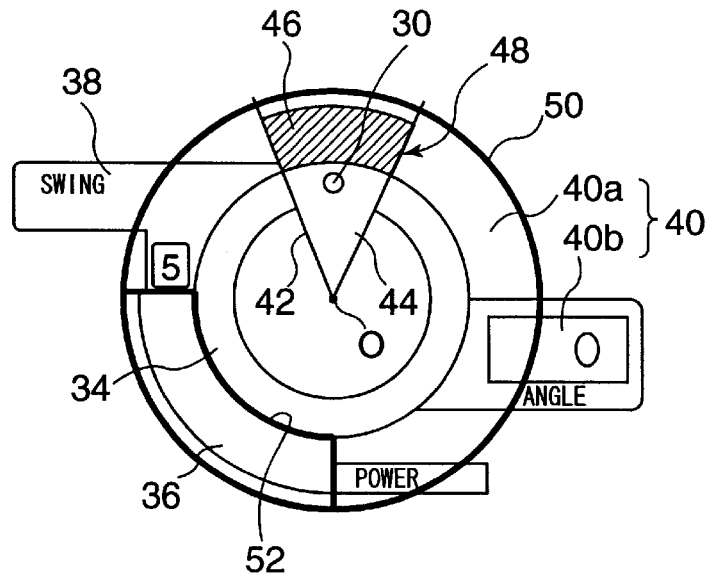
Figure 6:
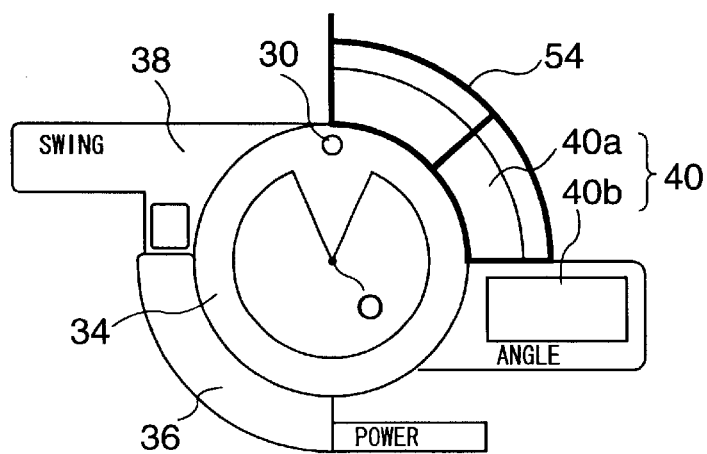

The throwing mark display unit 201j sets and displays the guide display area 34 in which the throwing mark 30 is rotated, and rotates the throwing mark 30 on and along the guide display area 34 as the throwing object character BA is rotated and stops its movement when the Z-button 183m is turned on. The area mark display unit 201k displays an area mark specifying the throwing area (the throw of the throwing object character BA made within this area is valid) of the throwing object character BA. This area mark is defined by two bold line segments 42, 44 extending in V-shape outward from the center O of the reference circle 32 as shown in FIG. 5. An angle between the two line segments 42, 44 is set at, e.g. 30°.

The "V"-shape defined by the line segments 42, 44 is so set as to coincide with the contour lines of the "V"-shaped portion 34a of the guide display area 34. When the two line segments 42, 44 are displayed, an arcuate strip 46 is simultaneously displayed outside the ring-shaped guide display area 34 and between the two line segments 42, 44. This strip 46 forms part of the area mark and is displayed in, e.g. white, so that the game player can easily see the throwing area. In the following description, the area mark defined by the two line segments 42, 44 and the strip 46 is identified by 48. The throwing object character BA can be thrown within an area where the throw is valid by turning the Z-button 183m on while the throwing mark 30 is present within the throwing area specified by the area mark 48.

When this area mark 48 is displayed, a bold circular contour line 50 is simultaneously displayed in such a position outside the guide display area 34 to substantially enclose the level display area 36, the rotation index display area 38 and the angle display are 40 as shown in FIG. 5. Further, before the area mark 48 and the circular contour line 50 are displayed, a bold fan-shaped contour line 52 enclosing the level display area 36 is displayed by the area mark display unit 201k. How the game is proceeded is guided to the game player (i.e. the game player is urged to store the throwing power by rotating the stick-shaped controller 183e) by displaying the circular contour line 50 and the fan-shaped contour line 52. Upon the start of the rotation of the stick-shaped controller 183e, the fan-shaped contour line 52 is first displayed and then the area mark 48 and the circular contour line 50 are displayed.

The level display unit 201m sets and displays the level display area 36, and displays the level (amount) of the stored throwing power to be given to the throwing object character BA in the level display area 36 in accordance with a signal sent from the stick-shaped controller 183e. Specifically, this level display is made by coloring the level display area 36 in chromatic colors and gradually increasing a colored area as the stored throwing power is increased. The chromatic color gradually changes from a cold color (e.g. blue) given first to the level display area 36 toward a warm color (e.g. orange) as the colored area increases.

This enables the game player to intuitively grasp the level of the stored throwing power. If the throwing power is still on the increase after the entire level display area 36 is colored, the chromatic color gradually changes toward a warm color (e.g. red) different from the one previously given to the level display area 36 as the stored throwing power is increased.

The rotation index display unit 201n sets and displays the rotation index display area 38 showing an index relating to the number of rotation, counts down the index from a maximum permissible rotation number set beforehand as the number of rotation of the player character MA and the throwing object character BA increases, and successively displays a numerical value corresponding to the number of rotation still to be made. Specifically, the maximum permissible rotation number is set at 5 in this embodiment, and "5" is displayed if the number of rotation is less than 1; "4" is displayed as a remaining number of rotation upon completion of one rotation, and "1" is subtracted from the remaining number of rotation every time one rotation is made until "0" is finally displayed. The game player turns the Z-button 183m on while rotating the stick-shaped controller 183e as fast as possible until "0" is displayed. The throw is judged to be "FOUL" unless the Z-button 183m is turned on before "0" is displayed.

The angle display unit 201p sets and displays the angle display area 40 indicating the throwing angle of the throwing object character BA, and displays the increasing throwing angle in the angle display area 40 while the Z-button 183m is kept on. Specifically, this angle display is made by, on one hand, coloring the color display zone 40a of the angle display area 40 in a chromatic color (e.g. yellow) and increasing the colored zone as the throwing angle is increased and, on the other hand, displaying a numerical value of the throwing angle in the numerical value display zone 40b. This enables the game player to intuitively and, at the same time, visually grasp the throwing angle.

The angle display unit 201p displays a bold fan-shaped contour line 54 enclosing the color display zone 40a of the angle display area 40 when the Z-button 183m is turned on. By displaying the fan-shaped contour line 54, how the game is proceeded is guided to the game player (i.e. the game player is urged to adjust the throwing angle).

Figure 7:
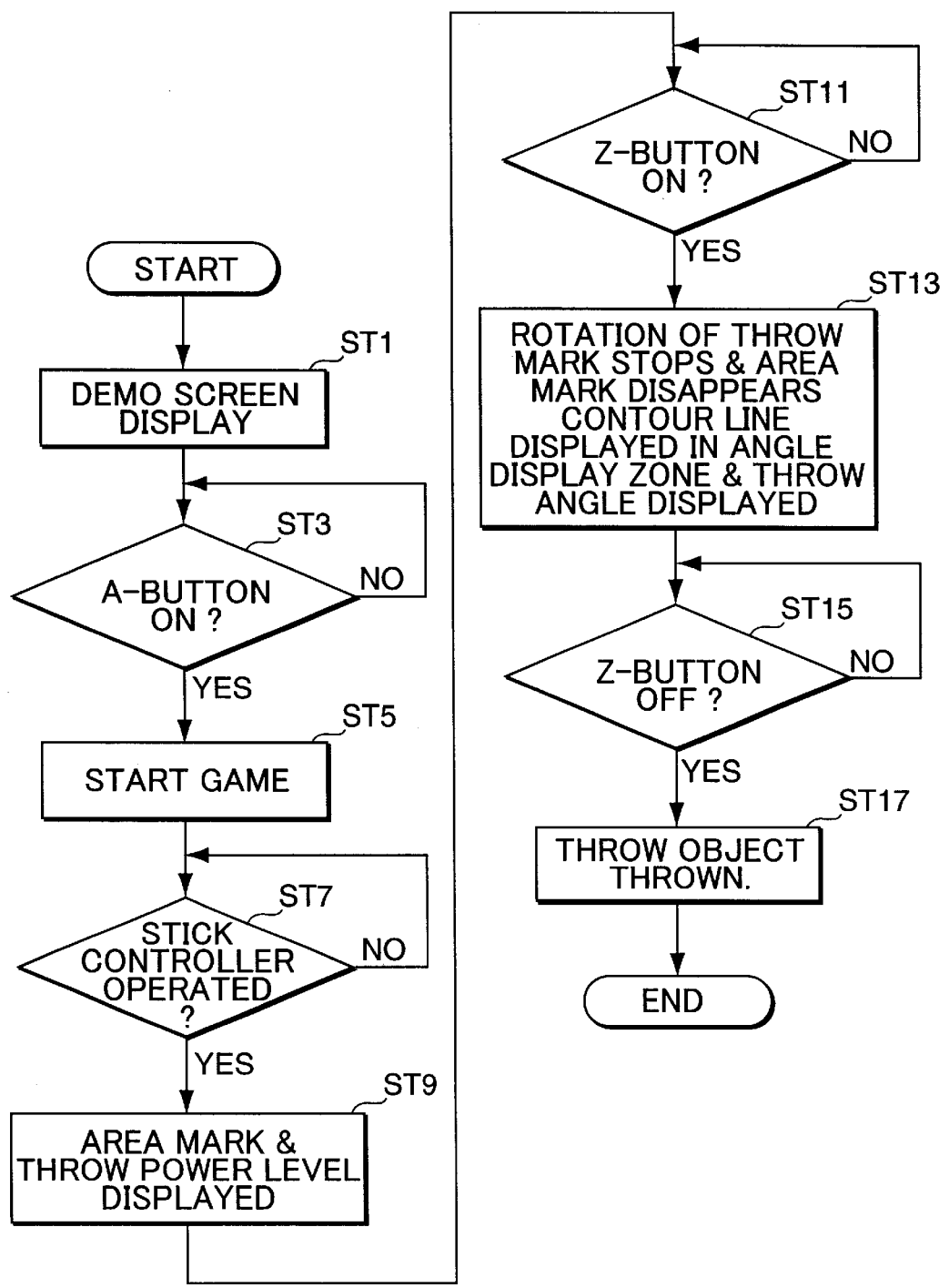
FIG. 7 is a flow chart mainly showing the throw guide displaying method executed in the video game system shown in FIG. 1, and FIGS. 8 to 12 are diagrams showing game screens in the video game system shown in FIG. 1.

FIG. 7 is a flow chart mainly showing a throw guide displaying method for guiding the throwing timing in this video game. First, upon selecting the hammer throwing game by turning the start button 183a on, a demonstration screen is displayed (Step ST1) and it is then detected whether the A-button 183b has been turned on (Step ST3). If the discrimination result in Step ST3 is affirmative, the player character MA and the throwing object character BA before the rotation are displayed by the character display control unit 201h and the guide display section GD shown in FIG. 3 is displayed by the guide display control unit 201i to start the game (Step ST5). If the discrimination result in Step ST3 is negative, this routine waits on standby until the A-button 183b is turned on.

It is then detected whether the stick-shaped controller 183f has been operated (Step ST7). If the discrimination result in Step ST7 is affirmative, the rotation of the player character MA and the throwing object character BA is started at an initial speed set beforehand by the character display control unit 201h, and the throwing mark 30 is rotated on the guide display area 32 of the guide display section at an initial speed set beforehand by the throwing mark display unit 201j as the player character MA and throwing object character BA are rotated.

If the discrimination result in Step ST7 is affirmative, the fan-shaped contour line 52 shown in FIG. 5 is displayed, then the line segments 42, 44 and the strip 46 forming the area mark 48 and the circular contour line 50 are displayed by the area mark display unit 201k and, simultaneously, the level of the stored throwing power to be given to the throwing object character BA by the throwing power giving unit 201e is displayed in the level display area 36 by the level display unit 201m (Step ST9). FIG. 2 shows a game screen at this stage, in which the level of the stored throwing power increased while the stick-shaped controller 183e is kept operated is successively displayed in the level display area 36. If the discrimination result in Step ST7 is negative, this routine waits on standby until an affirmative result comes up in the discrimination as long as a predetermined time elapses. Upon the lapse of the predetermined period, this throw is judged to be "FOUL" and a corresponding message is displayed in the foul display column FD of the game screen.

It is then detected whether the Z-button 183m has been turned on while the throwing mark 30 is located in the throwing area (Step ST11). If this discrimination result is affirmative, the rotation of the throwing mark 30 is stopped by the throwing mark display unit 201j; the area mark (line segments 32, 44 and strip 46), the circular contour line 50 and the fan-shaped contour line 52 are caused to disappear by the area mark display unit 201k, the fan-shaped contour line 54 enclosing the color display zone 40a of the angle display area 40 is displayed; and the throwing angle given to the throwing object character BA by the throwing angle setting unit 201f is successively displayed in the angle display area 40 by the angle display unit 201p while the Z-button 183m is kept on (Step ST13).

The Z-button 183m is normally turned on during the fifth rotation of the throwing object character BA which is the maximum permissible rotation number ("0" is displayed in the rotation index display area 38 at this stage). Although the Z-button 183m can be turned on during the fourth or preceding rotation, it is disadvantageous in proceeding the game since no sufficient level of the stored throwing power can be reached.

Figure 8:
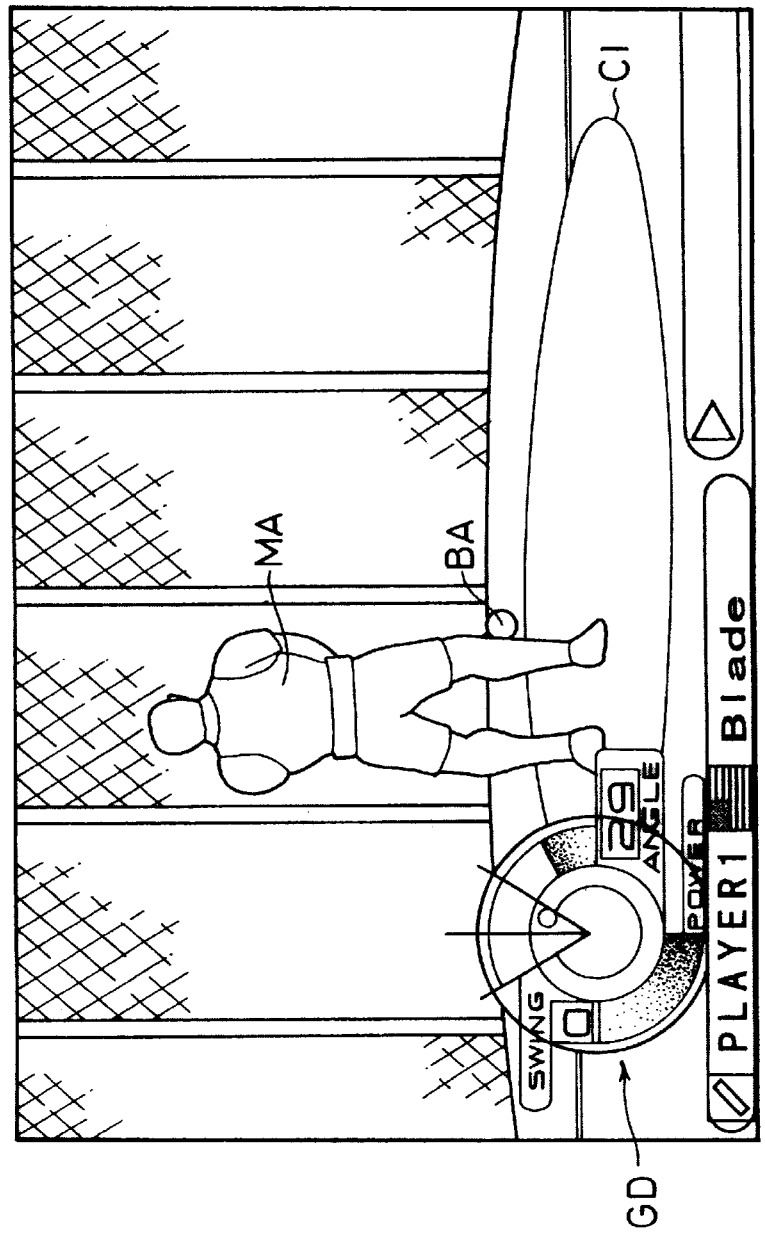

FIG. 8 is a diagram showing a game screen at this stage. Since the area mark 48, the circular contour line 50 and the fan-shaped contour line 52 are set to gradually disappear, they are still displayed in FIG. 8. The rotating speed of the player character MA and the throwing object character BA is reduced so that the player character MA and the throwing object character BA slowly rotate at the same time when the Z-button 183m is turned on. If the discrimination result in Step ST11 is negative, this routine waits on standby until an affirmative result comes up in the discrimination as long as a predetermined time elapses. Upon the lapse of the predetermined period, this throw is judged to be "FOUL" and a corresponding message is displayed in the foul display column FD of the game screen.

It is then detected whether the Z-button 183m has been turned off (Step ST15). The Z-button 183m is turned off when the throwing angle reaches a predetermined value (preferably 45°). If the discrimination result in Step ST15 is affirmative, the character display control unit 201h causes the player character MA to throw the throwing object character BA in a specified direction (Step ST17). Although the throwing angle is set up to a maximum of 90°, the throwing angle beyond 90° is judged to be "FOUL".

Figure 9:
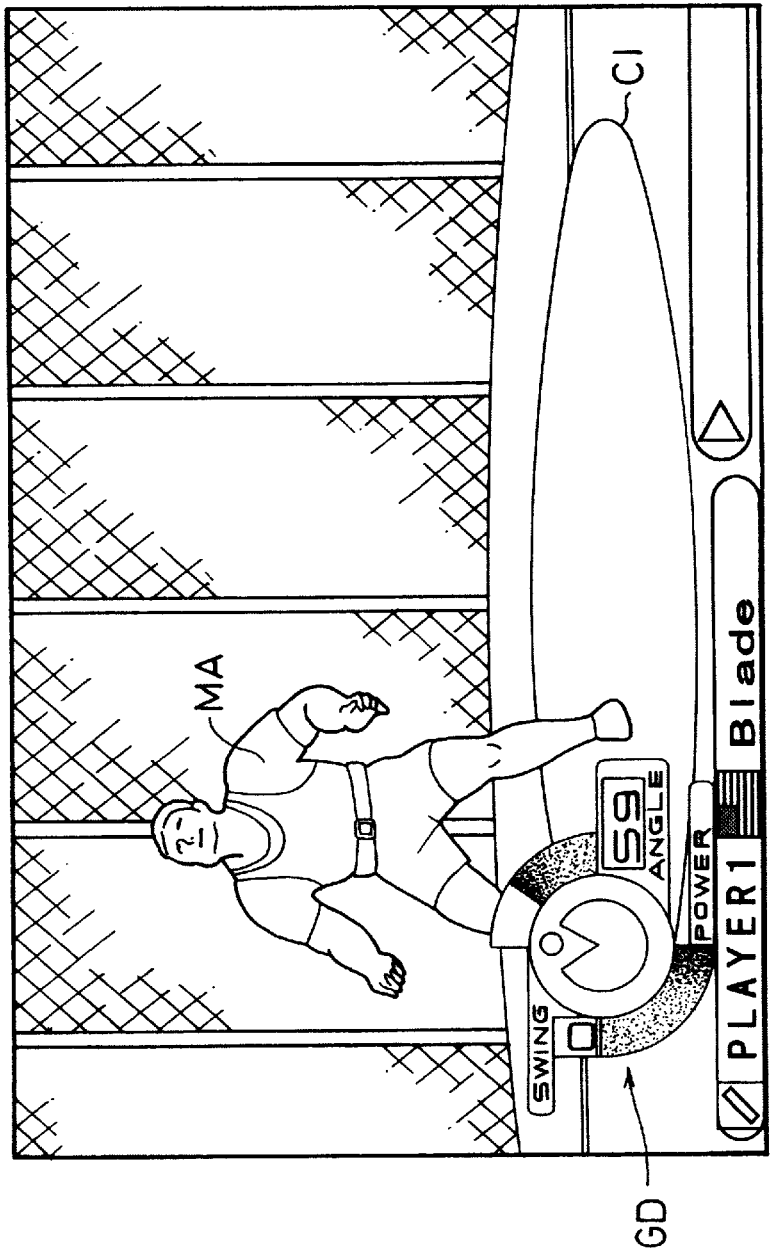
Figure 10:
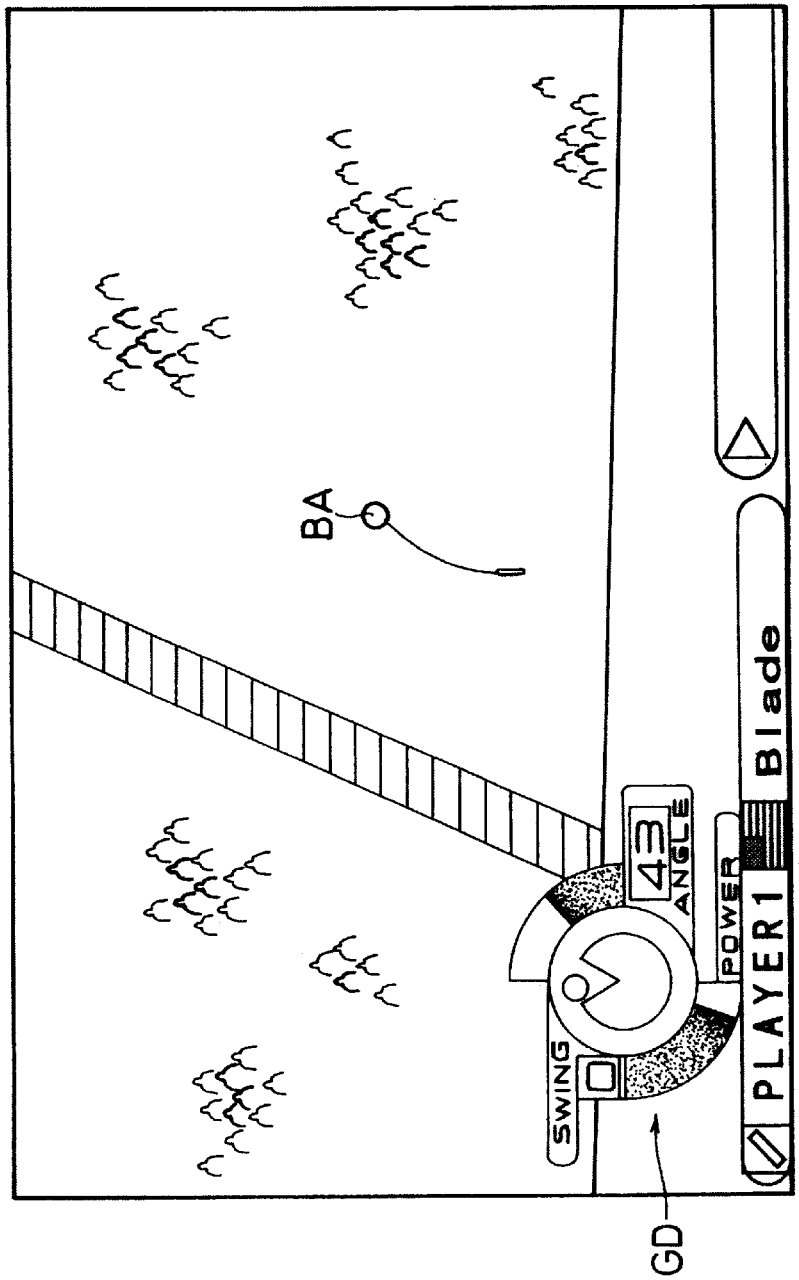

FIGS. 9 to 12 are diagrams showing game screens after the throwing object character BA is thrown. FIG. 9 shows a state where the throwing object character BA is thrown at a throwing angle of 59° and the player character MA is gazing at the flying direction of the throwing object character BA. FIG. 10 shows a state where the throwing object character BA is flying in the air.

Figure 11:
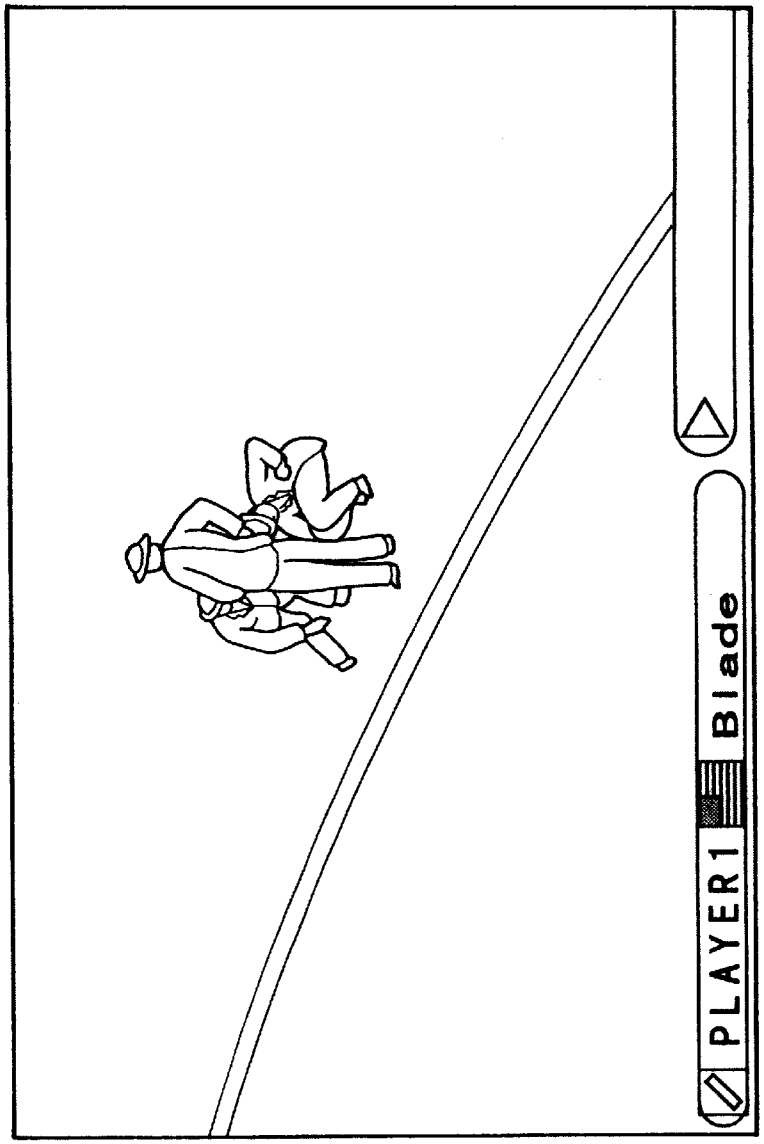
Figure 12:
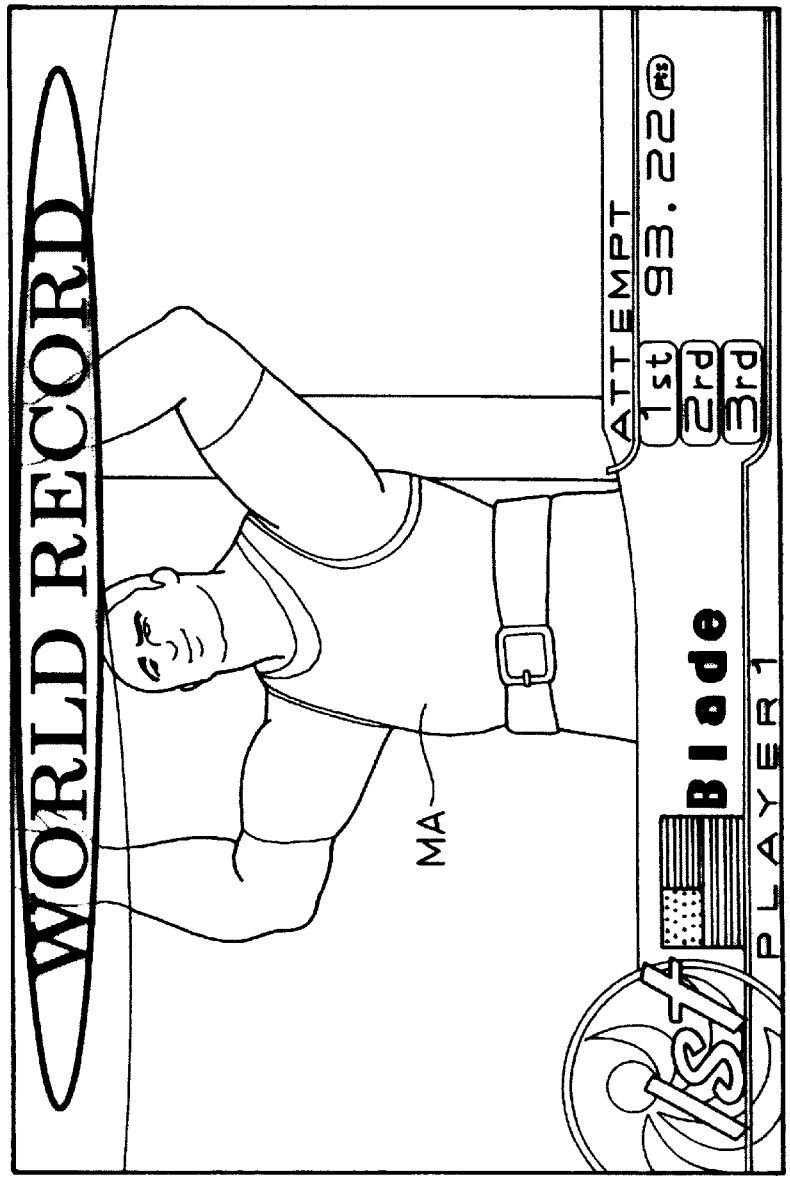

FIG. 11 shows a state where a plurality of judges are measuring a thrown distance of the throwing object character BA landed onto the field. The measured thrown distance is displayed at the lower right part of the game screen. In FIG. 12, the thrown distance of the first throw displayed is 93.22 M, "WORLD RECORD" is displayed at the top, and the player character MA looks in triumph. As described above, in this game, ranking is determined among the player character(s) MA corresponding to one to four game players and those who are stored in the memory unit 12 beforehand and do not appear on the game screen based on maximum thrown distances obtained after throwing the throwing object character BA three times.

Since the guide display section GD is displayed in a substantially fixed position in a partial area of the game screen as described above according to this embodiment, the game player can exactly grasp the throwing timing (i.e. the operation timing of the controller 183) of the throwing object character BA by only carefully looking at the guide display section GD without looking at a wide game screen. Specifically, the guide display area 34 is set in the guide display section GD, and the throwing mark 30 which rotates as the throwing object character BA is rotated is displayed in this guide display area 34, whereas the area mark 48 specifying the throwing area of the throwing object character BA is so displayed as to correspond to the guide display area 34. Thus, the game player can securely throw the throwing object character BA within a range where the throw is deemed to be valid by performing a specified operation while the throwing mark 30 is located within the throwing area.

Since the level display area 36 is set in a position in vicinity of the guide display area 34 and the level of the stored throwing power is displayed in the level display area 36, the game player can perform the specified operation when the throwing power is maximally increased by carefully looking at the guide display area 32 and the level display area 36. Further, since the rotation index display area 38 is set in a position in vicinity of the guide display area 34 and the index relating to the number of rotation is displayed in this rotation index display area 38, the game player can maximally increase the throwing power by carefully looking at the guide display area 34, the level display area 36 and the rotation index display area 38.

Further, since the angle display area 40 is set in a position in vicinity of the guide display area 34 and the throwing angle is displayed in the angle display area 40, the game player can set a preferable throwing angle by carefully looking at the angle display area 40 together with the other display areas. According to this embodiment, the guide display section GD can be displayed independently of the rotation of the player character MA and the throwing object character BA by setting the guide display section GD in the substantially fixed position of the partial area of the game screen. As a result, the display can be made more dynamic using game screens in which the viewing point is changed if necessary and those in which the viewing distance is differed, thereby making the game more interesting and ingenuous. Whether or not the game screen should be dynamically displayed may be arbitrarily set according to the content of the game.

The present invention is not limited to the foregoing embodiment, and may take various embodiments as described below.

(1) Although the throwing mark 30 moves to make a circular trace along the ring-shaped guide display area 32 in the foregoing embodiment, the movement thereof is not limited to such a rotation. For instance, the guide display area 32 may be set to be linear and the throwing mark 30 may reciprocate along the linear guide display area 32. In such a case, the game player can easily grasp the throwing timing if the area mark is so displayed as to correspond to the linear guide display area 32. In the case of setting the linear guide display area 32, the other display areas including the level display area can also be linear.

If the guide display area 32 is displayed in ring-shape and the throwing mark 30 is rotated as in the foregoing embodiment, the movement of the throwing mark 30 can be easily seen. Particularly in the case that the throwing power is increased using the stick-shaped controller 183e, such an operation can be performed by rotating the stick while inclining it. Since the movement of the stick and that of the throwing mark are similar, the game player can intuitively easily grasp the movement of the throwing mark 30.

(2) Although the two line segments 42, 44 defining the area mark are so displayed as to cross the ring-shaped guide display area 32 in the foregoing embodiment, they may be displayed adjacent to the outside of the ring-shaped guide display area 32. In other words, it is sufficient enable confirmation of the throwing area by displaying the area mark in correspondence with the guide display area 32. Further, the strip 46 defining the area mark is not necessarily needed.

(3) Although the level of the stored throwing power is displayed by chromatically coloring the level display area 36 in the foregoing embodiment, it may be displayed by coloring the power storing area 30 in achromatic colors such as gray and black. In the case that the tone of the chromatic color is changed, it may be changed from warm color to cold color or different chromatic colors may be randomly given to the level display area 36. Further, instead of or in addition to chromatic display, the level of the stored throwing power may be displayed in numerical values.

(4) Although the index relating to the number of rotation of the player character MA and the throwing object character BA is counted down from the maximum permissible rotation number (5 in the foregoing embodiment) and the numerical values representing the remaining numbers of rotation are successively displayed every time one rotation is made in the foregoing embodiment, the number of rotation may be counted up and successively displayed every time one rotation is made. Further, instead of or in addition to the numerical display, color display may be made. For example, the color tone may be gradually changed from warm color to cold color (or from cold color to warm color) as the number of rotation is counted down or up. Further, a time required to make a necessary number of rotation may be used as an index relating to the number of rotation.

(5) Although the throwing angle is increased while the Z-button 183m is kept on in the foregoing embodiment, the Z-button 183m may be turned on twice and the throwing angle may be increased between the first time and the second time. In such a case, different buttons may be operated for the first and second times. Although both the color display and the numerical display are made to show the throwing angle, either one of them may be made for this purpose.

(6) Although the rotating speed of the throwing mark 30 is accelerated as the throwing power is stored in the foregoing embodiment, the throwing mark 30 may rotate at a constant speed regardless of how much throwing power is stored. Such an arrangement is suitable for beginners of this game.

(7) Although the throwing power is stored by operating the stick-shaped controller 183e in the foregoing embodiment, it may be stored by repeatedly operating an other button such as the A-button 183b or the B-button 183c.

(8) Although the "hammer throwing game" is described as the throwing game to be executed in the foregoing embodiment, the present invention is also applicable to a "discus throwing game" in which the player character MA and the throwing object character BA are rotated by a specified number of times, and a "shot put game", "javelin throwing game" or like throwing game in which the player character MA and the throwing object character BA make about a half turn (twisting movement).

As described above, in the inventive video game in which the player character displayed on the monitor is rotated together with the throwing object character and the throwing object character is thrown in a specified direction by the player character when the operation unit is operated at a specified timing, the guide display area is set in the partial area of the game screen displayed on the monitor, the throwing mark which moves as the throwing object character rotates is displayed in the guide display area, and the area mark specifying the throwing area of the throwing object character is so displayed as to correspond to the guide display area.

Thus, the game player can set the throwing direction in which the throw of the throwing object character is valid by performing a specified operation when the throwing mark movingly displayed in the guide display area is located within the throwing area specified by the area mark. In other words, the throwing direction can be set only by carefully looking at the throwing mark in the guide display area, and it is not necessary to constantly gaze at the wide area of the game screen unlike the prior art games. Therefore, the game player can exactly grasp the throwing timing of the throwing object character.

According to the present invention, the level display area for displaying the level of the stored throwing power may be set in vicinity of the guide display area, and this level display may be successively changed in the level display area as the level increases. This enables the game player to know the level of the stored throwing power by carefully looking at the level display area, with the result that the game player can exactly grasp the throwing timing of the throwing object character. According to the present invention, a one operable member (also referred to as a first operable member) may be a stick-shaped controller which includes an operation stick which can be inclined in any direction within a 360° range including forward, backward, leftward and rightward directions from an upright position by the external operation, and outputs an information concerning the direction and angle of inclination of the operation stick. Such an operable member enables the game player to smoothly proceed the game by continuously rotating the operation stick.

According to the present invention, the rotation index display area for displaying the index relating to the number of rotation of the throwing object character may be set in vicinity of the guide display area, and the index which is renewed every time the throwing object character makes one rotation may be successively displayed in the rotation index display area. This enables the game player to easily grasp the index relating to the number of rotation of the throwing object character, with the result that the game can be smoothly proceeded.

According to the present invention, the angle display area for displaying the throwing angle may be set in vicinity of the guide display area, the movement of the throwing mark may be restricted when the throwing mark is located within the throwing area and the second operable member is operated, and the throwing angle increased as this other operable member (also referred to as a second operable member) continues to be operated may be successively displayed in the angle display area. This enables the game player to set the throwing angle while the movement of the throwing mark is restricted, with the result that the game can be smoothly proceeded.

According to the present invention, the moving speed of the throwing mark displayed in the guide display area may be increased as the throwing power to be given to the throwing object character is increased. This urges the game player to quickly perform an input operation due to a shortened remaining time for storing the throwing power, with the result that the game can be made more interesting and ingenuous.

According to the present invention, the guide display area for movingly displaying the throwing mark may be displayed in ring-shape and the level display area may be displayed along the outer periphery of the guide display area. This enables the guide display area and the level display area to be set in a small area, with the result that the guide display section can be made compact.

According to the present invention, the guide display area for movingly displaying the throwing mark may be displayed in ring-shape and the rotation index display area may be displayed along the outer periphery of the guide display area. This enables the guide display area and the rotation index display area to be set in a small area, with the result that the guide display section can be made compact.

According to the present invention, the guide display area for movingly displaying the throwing mark may be displayed in ring-shape and the angle display area may be displayed along the outer periphery of the guide display area. This enables the guide display area and the angle display area to be set in a small area, with the result that the guide display section can be made compact.

According to the present invention, the guide display area for movingly displaying the throwing mark may be displayed in ring-shape and the contour line enclosing the level display area may be displayed when the first operable member is operated. This can guide the game player how to proceed the game, with the result that the game player can smoothly proceed the game.

According to the present invention, the guide display area for movingly displaying the throwing mark may be displayed in ring-shape and the throwing area may be displayed by the area mark defined by two line segments extending radially outward from the center of the circle formed inside the ring-shaped guide display area while forming a V-shape together when the first operable member is operated. This enables the throwing area to be clearly displayed, with the result that the game player can more exactly grasp the throwing timing of the throwing object character. It should be noted that the two line segments defining the area mark may extend in any radially outward direction from the center of the circle formed inside the guide display area as long as they form a V-shape together.

According to the present invention, the arcuate strip may be displayed in a position between the two line segments displaying the throwing area and outside the guide display area. This enables the throwing area to be clearly displayed, with the result that the game player can more securely grasp the throwing timing of the throwing object character.

According to the present invention, the circular contour line may be displayed at the outer periphery of the guide display area when the area mark defined by the two line segments is displayed. This can guide the game player how to proceed the game, with the result that the game player can smoothly proceed the game.

According to the present invention, the contour line enclosing the angle display area may be displayed when the second operable member is operated. This can guide the game player how to proceed the game, with the result that the game player can smoothly proceed the game.

According to the present invention, the rotating speed of the player character and the throwing object character may be reduced in response to the operation of the second operable member. This enables the rotating speed of the player character and the throwing object character to be reduced when the movement of the throwing mark is restricted, with the result that the game screen can be smoothly displayed without letting the game player have any feeling of incongruity.

According to the present invention, the throwing object character may be thrown in a specified direction when the throwing mark is located within the throwing area and the operation of the second operable member is canceled. This enables the throwing game to be securely executed.

According to the present invention, the guide display area may be set in the partial area of the game screen displayed on the monitor; the throwing mark which moves in relation to the rotation of the throwing object character may be displayed in the guide display area; the area mark for specifying the throwing area of the throwing object character may be so displayed as to correspond to the guide display area; the level display area for displaying the level of the stored throwing power to be given to the throwing object character and corresponding to the flying distance, the rotation index display area for displaying the index relating to the number of rotation of the throwing object character and the angle display area for displaying the throwing angle of the throwing object character are set in vicinity of the guide display area; and the level of the stored throwing power, the index relating to the number of rotation and the throwing angle may be successively displayed in the level display area, the rotation index display area and the angle display area, respectively.

With the above arrangement, the game player can set the throwing direction in which the throw of the throwing object character is judged to be valid by performing a specific operation when the throwing mark movingly displayed in the guide display area is located within the throwing area specified by the area mark, and exactly grasp the throwing timing of the throwing object character by confirming the throwing power displayed in the level display area, the throwing angle displayed in the angle display area, and the like. Further, the guide display section can be made compact since the level display area, the rotation index display area and the angle display area are set in vicinity of the guide display area.

Further, according to the present invention, the guide display area for movingly displaying the throwing mark may be displayed in ring-shape, whereas the level display area, the rotation index display area and the angle display area may be displayed along the outer periphery of the guide display area. This enables the guide display section to be more compact.

This application is based on Japanese application serial no. 2000-11021 filed on Jan. 19, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A video game device in which a game screen displayed on a monitor is controlled by operating an operation unit, comprising:
   a character display control unit for displaying a player character in such a manner as to be rotatable together with a throwing object character and making such a display that the throwing object character is thrown in a specified direction by the player character when the operation unit is operated at a specified timing; and
   a guide display control unit for setting a guide display area in a partial area of the game screen, displaying a throwing mark in the guide display area, the throwing mark moving in response to a rotation of the throwing object character, and displaying an area mark specifying a throwing area of the throwing object character in association with the guide display area.

2. A video game device according to claim 1, further comprising a throwing power giving unit for cumulatively giving a throwing power corresponding to a flying distance of the throwing object character to the throwing object character when a first operable member provided in the operation unit continues to be operated, wherein the guide display control unit sets a level display area for displaying the level of the throwing power stored by the throwing power giving unit in a vicinity of the guide display area, and successively displays the level of the stored throwing power in the level display area as this level is increased.

3. A video game device according to claim 2, wherein the first operable member is a stick-shaped controller which includes an operation stick which can be inclined in any direction within a 360° range including forward, backward, leftward and rightward directions from an upright position by an external operation, and outputs an information concerning a direction and an angle of inclination of the operation stick.

4. A video game device according to claim 1, wherein the guide display control unit sets a rotation index display area for displaying an index relating to the number of rotation of the throwing object character in a vicinity of the guide display area, and successively displays the index which is renewed every time the throwing object character makes one rotation in the rotation index display area.

5. A video game device according to claim 1, further comprising a throwing angle setting unit for cumulatively giving a throwing angle to the throwing object character by continuing operation of a second operable member provided in the operation unit, wherein the guide display control unit sets an angle display area for displaying the throwing angle given by the throwing angle setting unit in vicinity of the guide display area, restricts a movement of the throwing mark when, the throwing mark is located within the throwing area and the second operable member is operated, and successively displays the throwing angle increased as the second operable member continues to be operated.

6. A video game device according to claim 5, wherein the character display control unit reduces the rotating speed of the player character and the throwing object character in response to the operation of the second operable member while the throwing mark is located within the throwing area.

7. A video game device according to claim 6, wherein the character display control unit makes such a display that the throwing object character is thrown in a specified direction when the throwing mark is located within the throwing area and the operation of the second operable member is canceled.

8. A video game device in which game screens displayed on a monitor are controlled by operating an operation unit, comprising:
   a character display control unit for displaying a player character in such a manner as to be rotatable together with a throwing object character and making such a display that the throwing object character is thrown in a specified direction by the player character when the operation unit is operated at a specified timing; and
   a guide display control unit for setting a guide display area in a partial area of the game screens, displaying a throwing mark in the guide display area, the throwing mark moving in response to a rotation of the throwing object character, displaying an area mark for specifying a throwing area of the throwing object character in association with the guide display area, setting a level display area for displaying the level of stored throwing power to be given to the throwing object character and corresponding to a flying distance, a rotation index display area for displaying an index relating to the number of rotation of the throwing object character, and an angle display area for displaying a throwing angle of the throwing object character in a vicinity of the guide display area, and successively displaying the level of the stored throwing power, the index relating to the number of rotation and the throwing angle in the level display area, the rotation index display area and the angle display area, respectively.

9. A video game device according to claim 8, wherein the guide display control unit displays the guide display area in ring-shape and displays the level display area, the rotation index display area and the angle display area along an outer periphery of the guide display area.

10. A throw guide displaying method in a video game in which a player character displayed on a monitor is rotated together with a throwing object character and the throwing object character is thrown in a specified direction by the player character when an operation unit is operated at a specified timing, comprising the steps of:

setting a guide display area in a partial area of game screens displayed on the monitor;

displaying a throwing mark in the guide display area, the throwing mark moving in response to a rotation of the throwing object character; and displaying an area mark for specifying a throwing area of the throwing object character in association with the guide display area.

11. A throw guide displaying method according to claim 10, wherein a throwing power corresponding to a flying distance is cumulatively given to the throwing object character by continuing operation of a first operable member provided in the operation unit, a level display area for displaying the level of the stored throwing power is set in a vicinity of the guide display area, and the level of the stored throwing power is successively displayed as it is increased.

12. A throw guide displaying method according to claim 11, wherein the first operable member is a stick-shaped controller which includes an operation stick which can be inclined in any direction within a 360° range including forward, backward, leftward and rightward directions from an upright position by an external operation, and outputs an information concerning the direction and angle of inclination of the operation stick.

13. A throw guide displaying method according to claim 10, wherein a rotation index display area for displaying an index relating to the number of rotation of the throwing object character is set in vicinity of the guide display area, and the index which is renewed every time the throwing object character makes one rotation is successively displayed in the rotation index display area.

14. A throw guide displaying method according to claim 10, wherein a throwing angle is cumulatively given to the throwing object character by continuing operation of a second operable member provided in the operation unit, an angle display area for displaying the throwing angle is set in a vicinity of the guide display area, a movement of the throwing mark is restricted when the throwing mark is located within the throwing area and the second operable member is operated, and the throwing angle increased as the second operable member continues to be operated is successively displayed in the angle display area.

15. A throw guide displaying method according to claim 14, wherein the rotating speed of the player character and the throwing object character is reduced in response to the operation of the second operable member.

16. A throw guide displaying method according to claim 15, wherein the throwing object character is thrown in a specified direction when the throwing mark is located within the throwing area and the operation of the second operable member is canceled.

17. A throw guide displaying method in a video game in which a player character displayed on a monitor is rotated together with a throwing object character and the throwing object character is thrown in a specified direction by the player character when an operation unit is operated at a specified timing, comprising the steps of:

setting a guide display area in a partial area of game screens displayed on the monitor;

displaying a throwing mark in the guide display area, the throwing mark moving in response to a rotation of the throwing object character;

displaying an area mark for specifying the throwing area of the throwing object character in such a manner as to correspond to the guide display area;

setting a level display area for displaying the level of stored throwing power to be given to the throwing object character and corresponding to a flying distance, a rotation index display area for displaying an index relating to the number of rotation of the throwing object character, and an angle display area for displaying a throwing angle of the throwing object character in a vicinity of the guide display area; and successively displaying the level of the stored throwing power, the index relating to the number of rotation and the throwing angle in the level display, area, the rotation index display area and the angle display area, respectively.

18. A throw guide displaying method according to claim 17, wherein the guide display control unit displays the guide display area in ring-shape and displays the level display area, the rotation index display area and the angle display area along an outer periphery of the guide display area.

19. A computer-readable recording medium storing a throwing guide display program in which a player character displayed on a monitor is rotated together with a throwing object character and the throwing object character is thrown in a specified direction by the player character when an operation unit is operated at a specified timing, said throwing guide display program comprising the steps of:

setting a guide display area in a partial area of game screens displayed on the monitor;

displaying a throwing mark in the guide display area, the throwing mark moving in response to a rotation of the throwing object character; and displaying an area mark for specifying a throwing area of the throwing object character in association with the guide display area.

20. A computer-readable recording medium according to claim 19, wherein a throwing power corresponding to a flying distance is cumulatively given to the throwing object character by continuing operation of a first operable member provided in the operation unit, a level display area for displaying the level of the stored throwing power is set in a vicinity of the guide display area, and the level of the stored throwing power is successively displayed as it is increased.

21. A computer-readable recording medium according to claim 20, wherein the first operable member is a stick-shaped controller which includes an operation stick which can be inclined in any direction within a 360° range including forward, backward, leftward and rightward directions from an upright position by an external operation, and outputs an information concerning the direction and angle of inclination of the operation stick.

22. A computer-readable recording medium according to claim 19, wherein a rotation index display area for displaying an index relating to the number of rotation of the throwing object character is set in vicinity of the guide display area, and the index which is renewed every time the throwing object character makes one rotation is successively displayed in the rotation index display area.

23. A computer-readable recording medium according to claim 19, wherein a throwing angle is cumulatively given to the throwing object character by continuing operation of a second operable member provided in the operation unit, an angle display area for displaying the throwing angle is set in a vicinity of the guide display area, a movement of the throwing mark is restricted when the throwing mark is located within the throwing area and the second operable member is operated, the throwing angle increased as the second operable member continues to be operated is successively displayed in the angle display area.

24. A computer-readable recording medium according to claim 20, wherein the rotating speed of the player character and the throwing object character is reduced in response to the operation of the second operable member.

25. A computer-readable recording medium according to claim 20, wherein the guide display area for movingly displaying the throwing mark is displayed in ring-shape and the level display area is displayed along an outer periphery of the guide display area.

26. A computer-readable recording medium according to claim 22, wherein the guide display area for movingly displaying the throwing mark is displayed in ring-shape and the rotation index display area is displayed along an outer periphery of the guide display area.

27. A computer-readable recording medium according to claim 23, wherein the guide display area for movingly displaying the throwing mark is displayed in ring-shape and the angle display area is displayed along an outer periphery of the guide display area.

28. A computer-readable recording medium according to claim 20, wherein the guide display area for movingly displaying the throwing mark is displayed in ring-shape and a contour line enclosing the level display area is displayed when the first operable member is operated.

29. A computer-readable recording medium according to claim 20, wherein the guide display area for movingly displaying the throwing mark is displayed in ring-shape, and the throwing area is displayed in the form of an area mark defined by two line segments extending radially outward from the center of a circle formed inside the ring-shaped guide display area while forming a V-shape together when the first operable member is operated.

30. A computer-readable recording medium according to claim 29, wherein an arcuate strip is displayed in a position between the two line segments displaying the throwing area and outside the guide display area.

31. A computer-readable recording medium according to claim 29, wherein a circular contour line is displayed on the outer periphery of the guide display area when the area mark defined by the two line segments is displayed.

32. A computer-readable recording medium according to claim 27, wherein a contour line enclosing the angle display area is displayed in response to the operation of the second operable member.

33. A computer-readable recording medium according to claim 23, wherein the rotating speed of the player character and the throwing object character is reduced in response to the operation of the second operable member.

34. A computer-readable recording medium according to claim 33, wherein the throwing object character is thrown in a specified direction when the throwing mark is located in the throwing area and the operation of the second operable member is canceled.

35. A computer-readable recording medium storing a throwing guide display program in which a player character displayed on a monitor is rotated together with a throwing object character and the throwing object character is thrown in a specified direction by the player character when an operation unit is operated at a specified timing, said throwing guide display program comprising the steps of:

setting a guide display area in a partial area of game screens displayed on the monitor;

displaying a throwing mark in the guide display area, the throwing mark moving in response to a rotation of the throwing object character;

displaying an area mark for specifying the throwing area of the throwing object character in such a manner as to correspond to the guide display area;

setting a level display area for displaying the level of stored throwing power to be given to the throwing object character and corresponding to a flying distance, a rotation index display area for displaying an index relating to the number of rotation of the throwing object character, and an angle display area for displaying a throwing angle of the throwing object character in a vicinity of the guide display area; and successively displaying the level of the stored throwing power, the index relating to the number of rotation and the throwing angle in the level display area, the rotation index display area and the angle display area, respectively.

36. A computer-readable recording medium according to claim 35, wherein the guide display area for movingly displaying the throwing mark is displayed in ring-shape, and the level display area, the rotation index display area and the angle display area are displayed along an outer periphery of the guide display area.

37. A video game device in which a game screen displayed on a monitor is controlled by operating an operation unit, comprising:

a character display control unit for displaying a player character in such a manner as to be rotatable together with a throwing object character and making such a display that the throwing object character is thrown in a specified direction by the player character when the operation unit is operated at a specified timing; and a guide display control unit for setting a guide display area in a partial area of the game screen displayed in a substantially fixed specified position regardless of the fact that the game screen changes as a viewing point of the player character and the throwing object character changes, displaying a throwing mark in the guide display area, the throwing mark moving in response to a rotation of the throwing object character, and displaying an area mark specifying a throwing area of the throwing object character in association with the guide display area.

* * * * *